US012599467B2

(12) United States Patent
Fernández Fajardo et al.

(10) Patent No.: US 12,599,467 B2
(45) Date of Patent: Apr. 14, 2026

(54) MANDIBULAR OPENING AND ADVANCEMENT MEASUREMENT AND POSITIONING DEVICE

(71) Applicant: 3D UNICON INNOVA, S.L., Jerez de la Frontera (ES)

(72) Inventors: Daniel Fernández Fajardo, Cádiz (ES); José Luis Diaz González, Cádiz (ES); Juan José Fernández Vidal, Cádiz (ES); Daniel Sánchez Albertos, Cádiz (ES)

(73) Assignee: 3D UNICON INNOVA, S.L., Jerez de la Frontera (ES)

( * ) Notice: Subject to any disclaimer, the term of this patent is extended or adjusted under 35 U.S.C. 154(b) by 341 days.

(21) Appl. No.: 18/041,684

(22) PCT Filed: Aug. 11, 2021

(86) PCT No.: PCT/ES2021/070608
§ 371 (c)(1),
(2) Date: Feb. 14, 2023

(87) PCT Pub. No.: WO2022/034258
PCT Pub. Date: Feb. 17, 2022

(65) Prior Publication Data
US 2023/0346532 A1     Nov. 2, 2023

(30) Foreign Application Priority Data
Aug. 14, 2020    (ES) .................................. 202030870

(51) Int. Cl.
A61C 19/05        (2006.01)
A61C 9/00        (2006.01)

(52) U.S. Cl.
CPC ............ A61C 19/05 (2013.01); A61C 9/0006 (2013.01)

(58) Field of Classification Search
CPC .............................. A61C 19/05; A61C 9/0006
See application file for complete search history.

(56) References Cited

U.S. PATENT DOCUMENTS 2,001,963 A * 5/1935 Keller .................... A61C 19/05
                                                              433/42
5,154,609 A * 10/1992 George ................ A61C 9/0006
                                                              433/68

(Continued)

FOREIGN PATENT DOCUMENTS

ES          1213585 U      5/2018
WO    WO2008064666 A2      6/2008

OTHER PUBLICATIONS

International Search Report dated Aug. 12, 2021 for International Application No. PCT/ES2021/070608.

*Primary Examiner* — Nicholas D Lucchesi

(57)                ABSTRACT

Mandibular advancement measurement and positioning device provided with an instrument (1) with an upper slider (2) and a lower slider (3), means to measure and position the relative displacement of both sliders and two trays at one end of the instrument, one upper and one lower (11*a*, 11*b*), the trays being attached to each slider respectively, wherein the lower slider is divided into a fixed part (3*a*) and a pivoting part (3*b*) joined to the end of the fixed part (3*a*), being the upper and lower slider joined by means of a recess that allows a relative slide of both and wherein the pivoting part (3*b*) of the lower slider is provided with a vertical opening control (6). By means of the pivoting part and the opening control it is possible to measure and position the vertical opening.

10 Claims, 4 Drawing Sheets

(56)        References Cited

U.S. PATENT DOCUMENTS

| 5,794,627   | A  * | 8/1998  | Frantz ..................... A61F 5/566 |
| | | | 128/859 |
| 7,832,403   | B2 * | 11/2010 | Halstrom ............... A61F 5/566 |
| | | | 128/848 |
| 8,550,816   | B2 * | 10/2013 | Hanewinkel ......... A61B 5/1076 |
| | | | 433/140 |
| 8,783,260   | B2 * | 7/2014  | Remmers ............... A61F 5/566 |
| | | | 128/862 |
| 12,048,646  | B2 * | 7/2024  | Radmand ............... A61F 5/566 |
| 2005/0175954 | A1  | 8/2005  | Zacher |
| 2005/0202363 | A1  | 9/2005  | Osterwalder |
| 2011/0232652 | A1 * | 9/2011  | Levendowski ......... A61F 5/566 |
| | | | 128/848 |
| 2012/0064477 | A1  | 3/2012  | Schmitt |
| 2013/0023797 | A1 * | 1/2013  | Hanewinkel ......... A61B 5/1121 |
| | | | 29/428 |
| 2014/0186790 | A1  | 7/2014  | Schmitt |
| 2015/0068536 | A1  | 3/2015  | Remmers et al. |
| 2019/0076227 | A1 * | 3/2019  | Charkhandeh ....... A61B 5/4818 |

* cited by examiner

A-A

MANDIBULAR OPENING AND ADVANCEMENT MEASUREMENT AND POSITIONING DEVICE

CROSS-REFERENCE TO RELATED APPLICATION

This application is a national stage application, filed under 35 U.S.C. § 371, of International Patent Application No. PCT/ES2021/070608, filed on Aug. 11, 2021, which claims the priority of Spain application No. P202030870 filed on Aug. 14, 2020, the contents of which are incorporated by reference.

TECHNICAL FIELD

The present invention is encompassed in the field of dentistry, more particularly in that of instrumentation for mandibular measurement and positioning for the manufacture of splints and other devices for the protection or modification of the bite.

BACKGROUND OF THE INVENTION

Mandibular advancement devices (MAD) are a novel solution in the treatment of snoring and/or sleep apnea-hypopnea syndrome (SAHS). These devices are introduced into the oral cavity and during decubitus modify the position of the jaw, tongue and other supporting structures of the upper airways allowing the passage of air and preventing respiratory collapse while sleeping, which allows the disappearance of the snoring and improve apnea.

The splint must be made in a personalized way by a dentist or stomatologist so that it adapts perfectly to the patient's mouth and does not cause discomfort at bedtime.

MADs are used in simple snorers, mild SAHS patients, mild-moderate SAHS with low body mass index and as a second choice in patients who do not respond or reject positive pressure devices, patients at risk or with poor response to surgical treatment.

To design a MAD, there are gauges or devices for measuring mandibular advancement, such as that described in ES1213585 U. In this utility model, a device is proposed with two dental trays movable between them, one for the upper maxilla and the other for the lower maxilla. Material is placed in the trays to make the impressions of the dental arches. The first tray is connected to a ruled section, while the second tray is connected to a sliding slider on the ruled section with the relative movement between the trays. In this way, the respective advancement or backward movement of the trays is measured. For its part, the relative movement between trays is carried out by means of a pinion attached to a housing fixed to a tray and a rack engaged in the pinion and attached to the other tray.

These types of gauges are not sufficient for the detailed study of mandibular movements beyond the sagittal plane, nor do they allow the taking of images of the teeth in different positions of the jaw and then process the information on processors or mobile devices.

Undoubtedly, all techniques tend to digitize and automate processes that allow more efficient procedures. The possibility of digitally scanning the bite directly from the mouth is a need in the sector that has not yet been resolved.

On the other hand, there are other processes in which a mandibular displacement is required not only horizontally but also vertically. There is no tool that allows the professional, in a controlled way, to displace the jaw in its maximum anatomical path.

Currently, different tools are combined. On the one hand, the mandibular advancement devices in which the professional takes measurements regarding horizontal displacement and, on the other hand, the one known as George's Gauge. The latter allows the opening to be controlled by separating the incisors to determine the point at which continuous horizontal displacement is possible for the registration of dental occlusion.

Despite the solutions that can be found in the market, there are currently no elements that may take into account the optimum degree of opening together with the position between maximum retrusion and protrusion.

SUMMARY OF THE INVENTION

The object of the present invention is to provide a device for measuring mandibular advancement that allows controlling mandibular movement and blocking for taking records or taking measurements that can be used for the manufacture of MADs or discharge splints that resolve the problems set forth or any other case that requires such information. To this end, the invention proposes a device with means that allow horizontal mandibular displacement from maximum retrusion to maximum protrusion and from closure to maximum mouth opening. For this purpose, the device of the invention is provided with an instrument with an upper and a lower slider, means to measure and position the relative displacement of both sliders, and two trays at one end of the instrument, one upper and one lower, the trays being connected to each slider respectively, and wherein the lower slider is divided into a fixed part and a pivoting part attached to the end of the fixed part, the upper and lower slider being joined by means of a recess that allows a relative slide of both and wherein the pivoting part of the lower slider is provided with a vertical opening control. In one implementation, the means for measuring displacement are analog. In another implementation they may include a display and digital media. Furthermore, the device can be locked in a specific position where records can be taken digitally by scanner through windows in the trays where the molds are placed. Other optional features and their advantages are defined in the dependent claims.

In one implementation, the means for measuring displacement are analog. In another implementation they may include a display and digital media. Furthermore, the device can be locked in a specific position where records can be taken digitally by scanner through windows in the trays where the molds are placed. Other optional features and their advantages are defined in the dependent claims.

BRIEF DESCRIPTION OF THE FIGURES

In order to help a better understanding of the features of the invention and to complement this description, the following figures are attached as an integral part thereof, the nature of which is illustrative and not limiting.

DETAILED DESCRIPTION

Figure 1:
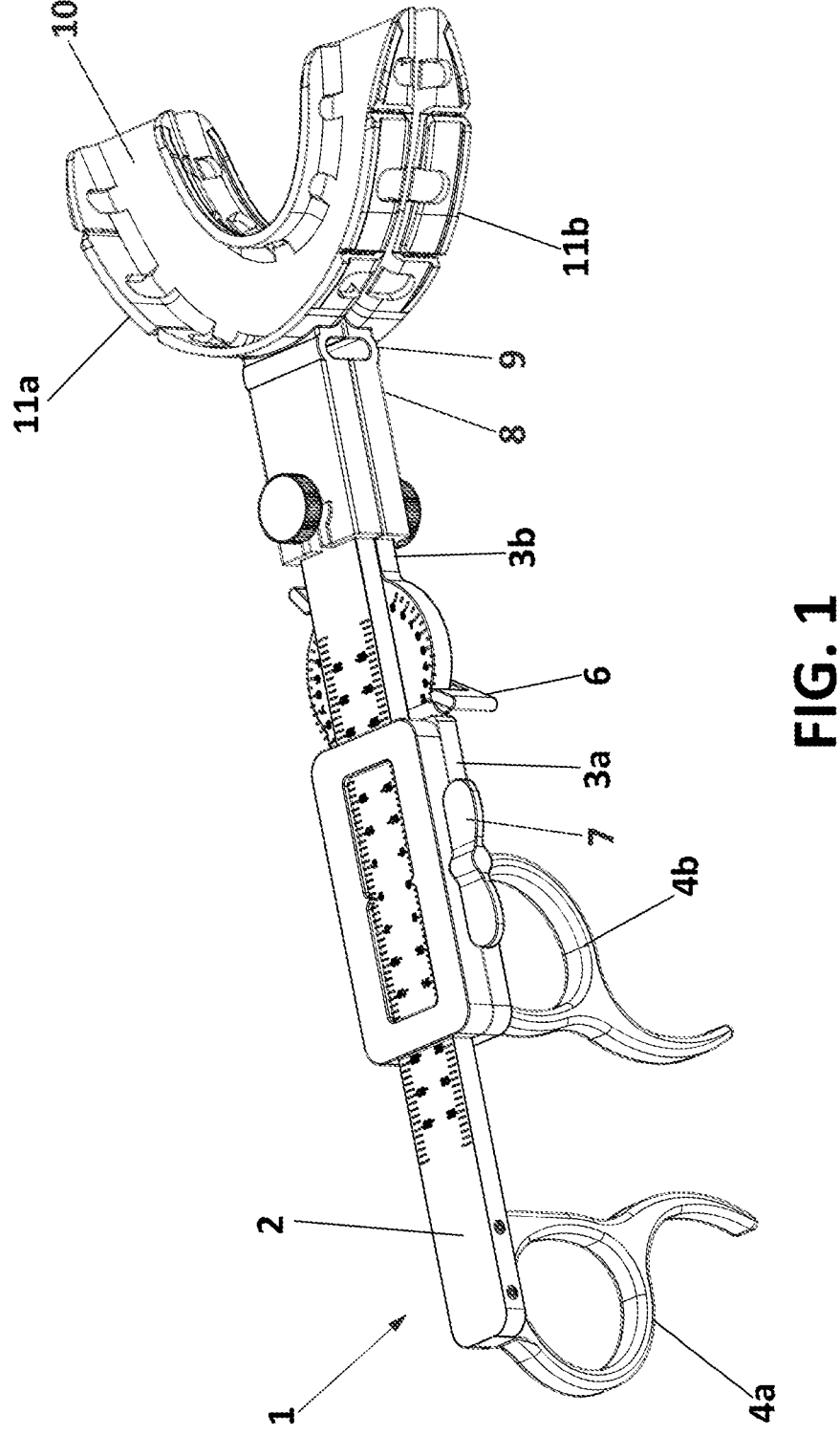
FIG. 1 shows a perspective view of the invention.
Figure 2:
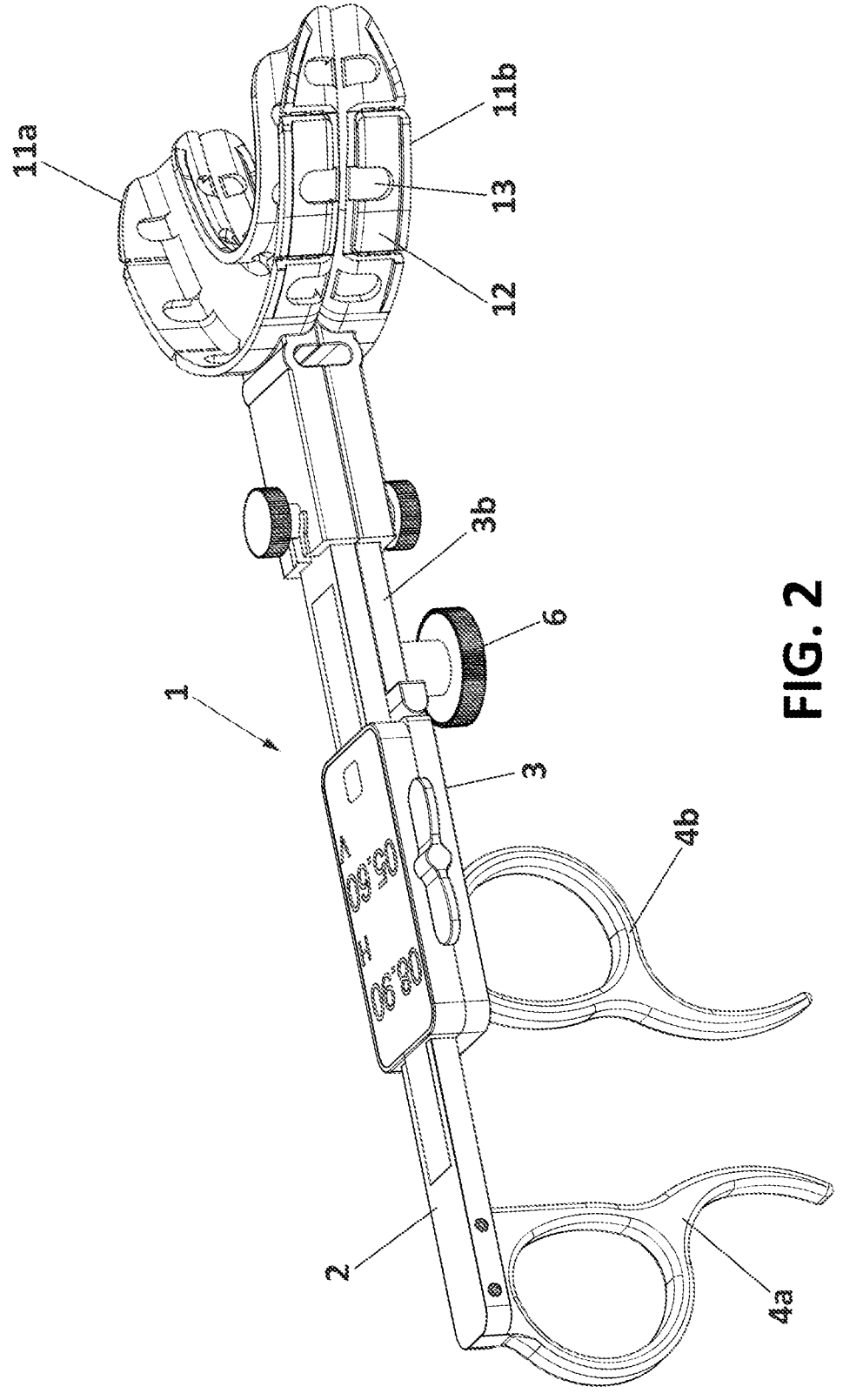
FIG. 2 shows a perspective view of an implementation provided with digital means for measuring displacements.
Figure 3:
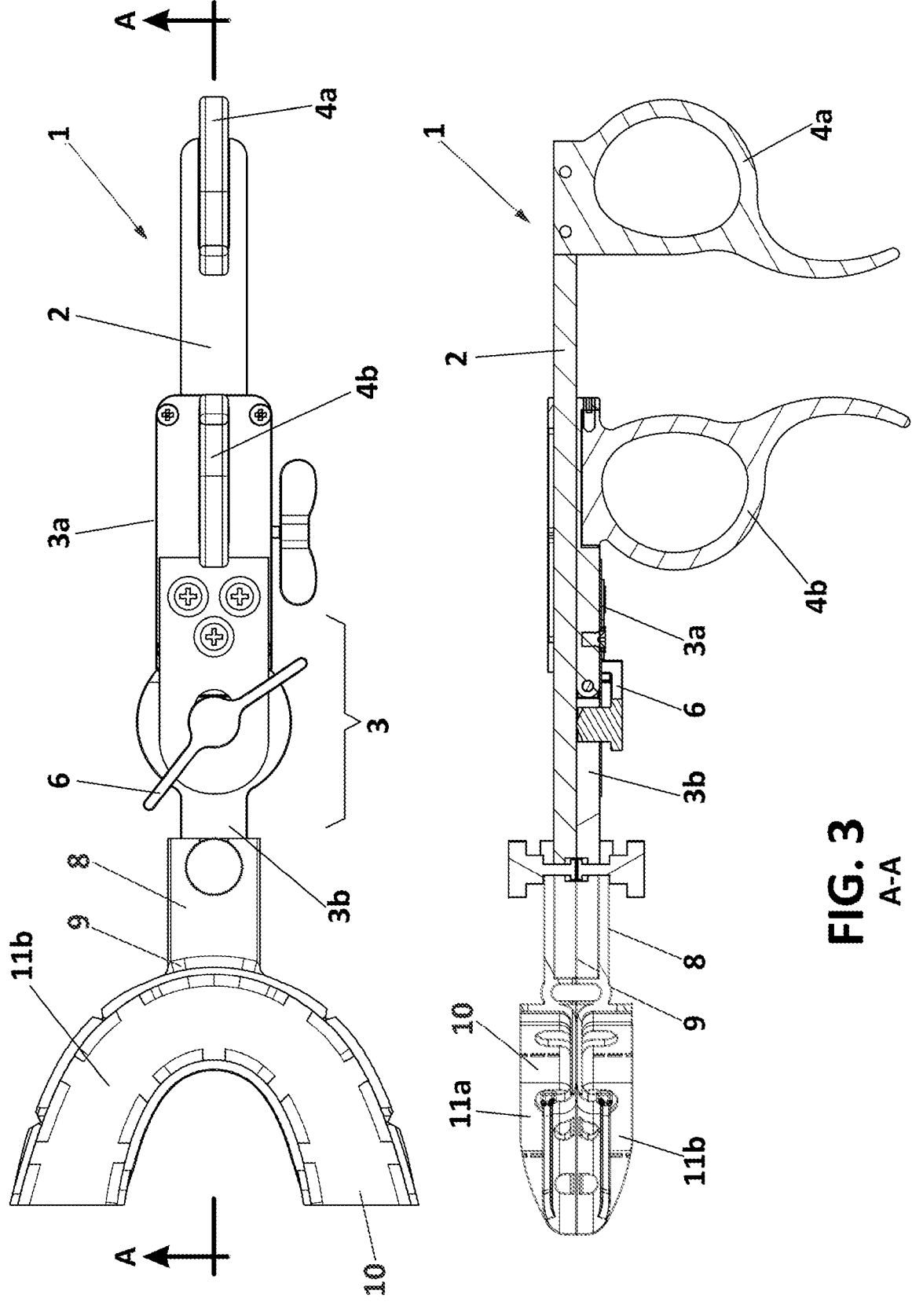
FIG. 3 is a plan and section view where the elements that facilitate the vertical and horizontal movement of the different parts can be seen.

With reference to FIGS. 1 and 3, the device of the invention has an instrument 1 for measuring and controlling the displacement of the jaws, made, for example, of tungsten or any low-density, high-strength metal. The instrument comprises two sliders, an upper one 2 and a lower one 3 whose relative displacement is measured and displayed, either with a scale drawn on the upper slider 2, or by digital means provided with a display (FIG. 2). In digital implementation, the display is of the type found in digital gauges or calipers and the device is capable of quantifying displacement by displaying it on the display with an accuracy of up to one-fiftieth of a millimeter. The digital media consist of two contacts perpendicular to the slider, one fixed and the other mobile. To achieve a higher resolution in the measurement, the moving part incorporates a vernier scale that completes the divisions of the rule. These measurements can be shown in millimeters or inches with the option of changing orientation (turning the digital media) according to the position where the healthcare professional is, and also allows defining the 0 point from which the displacements will be quantified with positive and negative values. In both analog and digital implementations, the instrument is fitted with trays (11*a* and 11*b*) made of biocompatible material or material approved for sanitary use at its end, intended to be inserted into the oral cavity. The instrument (1) is advantageously reusable while the trays (11*a*, 11*b*) are disposable. The instrument 1 has an upper slider 2 and a lower slider divided into two parts, a main part 3*a* which is the one that properly slides on the upper slider 2 and a pivoting part 3*b* that can be better seen in FIG. 3. The upper slider 2 is provided with a scale in mm or inches. A clamping system 4 provides a comfortable grip of the device while allowing horizontal movement of the lower slider 3 with respect to the upper slider 2 and vice versa, from minimum to maximum (in a preferential example, between −15 and 15 mm starting from 0 which is considered the point at which both trays are perfectly opposite). This clamping system 4 consists of two rings, one on each slider (4*a*, 4*b*), to insert the fingers. The rings are the same type as those found on scissors and similar tools. Optionally, the rings can be provided with finger support flaps. Thanks to this clamping system, it is possible to use the device in both directions, with the healthcare professional standing behind or in front of the patient. To facilitate measurements in both directions, the metric scale of the upper slider 2 is duplicated and oriented for both uses. In digital implementation, as mentioned before, the display is rotatable.

This system of sliders allows a continuous and stepless movement range, as it is not conditioned by a toothed wheel and with a precision greater than one tenth of a millimeter in its version with digital display.

The lower slider is divided into a main part 3*a*, which is the one that properly slides on the upper slider 2 and a pivoting part 3*b*. Both are joined by a shaft so that the part 3*b* rotates on the shaft located in the main part 3*a*, creating an angle between the upper slider 2 and the lower slider 3*b* and, consequently, separating the trays, thus causing the opening of the mouth (DV or vertical dimension).

The lower slider 3 in its main part 3*a* is joined to the upper one 2 by means of a recess, with a central opening and an indicator that determines the displacement on the ruled part of the upper slider 2, which allows the upper slider 2 to move in its interior. In the digital version, the recess is provided with a display.

The vertical movement is controlled by the vertical opening control 6 which, thanks to a threading system, manages to create a gap between the lower slider 3*b* and the upper slider 2. The opening control 6 comprises a screw with different thread pitches depending on to the opening level that is desired to be obtained with the rotation, which is continuously in contact with the upper slider 2. Depending on how much the opening control 6 protrudes from the lower slider 3*b* according to the level of threading, this produces a certain separation of the pivoting part 3*b* with the upper slider 2. To ensure that the opening is as desired and no more, at the junction of both sliders we find a strap 5 that compresses the lower pivoting slider 3*b* with the upper slider 2 preventing the opening from being free and being controlled exactly by the level of threading, how much it protrudes with respect to the lower slider 3*b*, of the opening control.

As with horizontal displacement, the degree of vertical opening can be measured by a scale on the lower slider. This scale is oriented in both directions, as in the case of the scale on the upper slider, for its correct vision during use both behind the patient and in front of her/him. Similarly, in the digital version, this measurement is expressed on the digital display located on the recess of the lower slider 3*a* and on which the upper slider 2 moves. This measurement is taken from the displacement of a spherical tip located in the lower pivoting slider 3*b* and in contact with the upper slider 2 and that, based on angular displacement sensors of those used in measuring instruments of the dial gauge type, allows the measurement to be displayed on the digital display, being possible to rotate it according to the position of the healthcare professional regarding the patient and its measurement in mm or inches.

There is a metric relationship in the lower slider and that in turn quantifies the distance between the two ends of the sliders and/or the separation of the trays in their front part. That is, this metric relationship quantifies the separation between the upper and lower incisors. This scale is calculated from a simple trigonometric formula that relates the angle between the upper slider 2 and the pivoting slider 3*b* with the distance between the ends of both sliders.

The upper and lower trays are fixed to the respective sliders by means of a knurled threading system or clipping system (in the case of the lower tray, the fixation is to the pivoting part 3*b* of the lower slider) thanks to which the placement and removal of the trays on the device can be done manually very easily.

This allows the upper and lower impressions to be taken independently prior to placement on the device.

Figure 4:
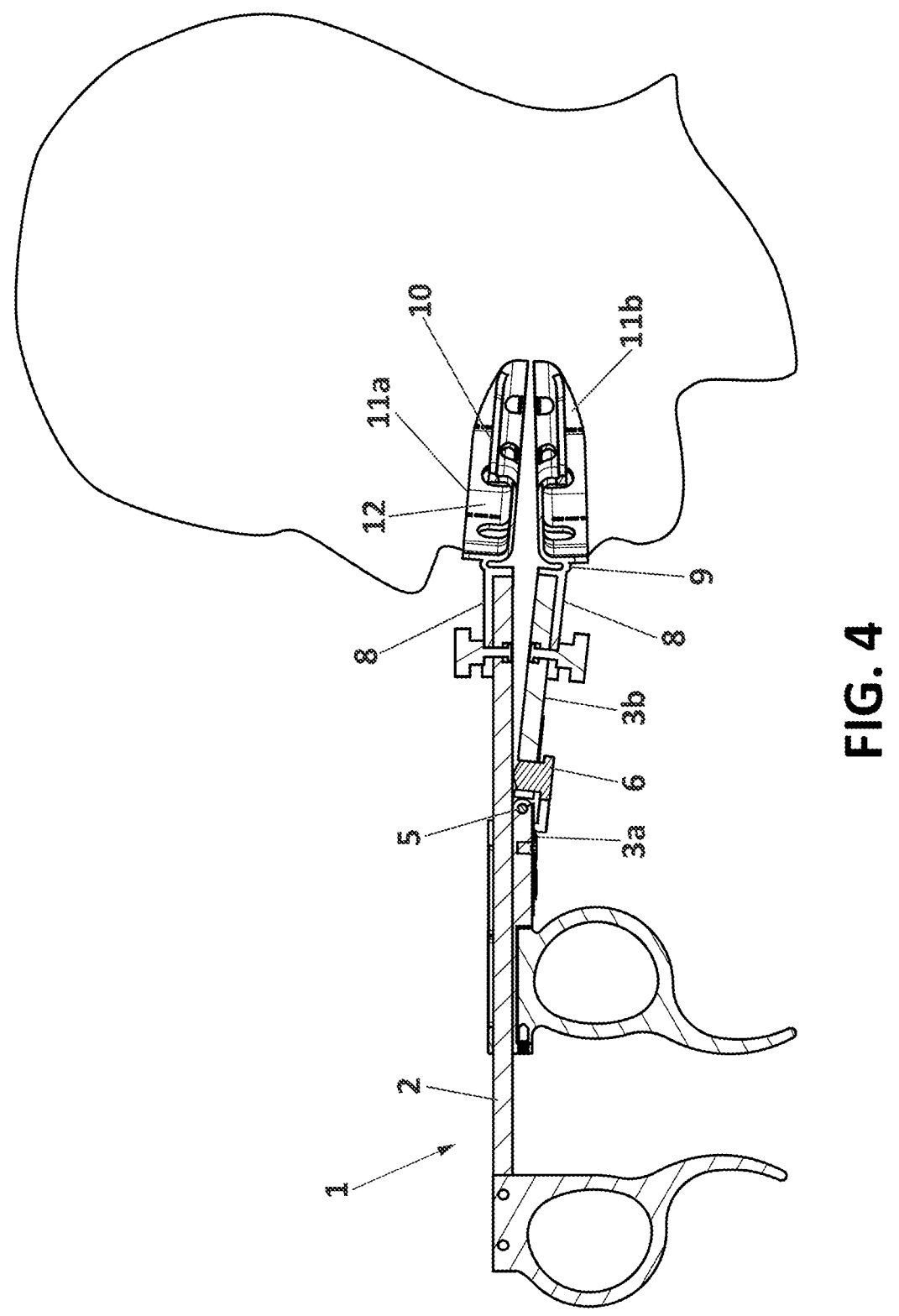
FIG. 4 shows the invention in detail once it is in use.

As can be seen in FIGS. 1 and 4, the trays are divided into three parts. A first body 8 that holds the end of the slider and has a positioning system (poka yoke in English) that guarantees its position in front of the slider, a part 10 arranged with a series of cavities 13 created to house the impression material for the impression of the bite and increase its adherence with a projecting frame provided in the contour of its outer part that facilitates the removal of excess material with the use of a scalpel and a flexible part 9 that joins the body 8 with the part provided with cavities 10 and allowing them to pivot between them, opposing a certain resistance inherent to the tension generated by the material.

In addition, the part of the tray containing the material for taking the impression has a pre-cut surface that forms the windows 12 that can be removed manually and that reveals the impression material at the height of the premolars and canines, which guarantees an easy removal, homogenization in the taking of records and a reference to remove the material with the help of a scalpel and that allows to uncover the mentioned teeth.

The horizontal displacement from maximum retrusion to maximum protrusion does not oppose resistance, except for the friction force itself created between the upper slider 2 and the lower slider 3*a* that holds it. This is an important feature, since in cases where the patient's sleep is induced for the study of mandibular behavior, the sliders do not oppose any resistance and it is the patient herself/himself who brings the device to maximum retrusion, or its natural position. To keep the device in a specific position, it is therefore necessary to lock between the upper slider 2 and the lower slider 3. This lock is achieved by any mechanical brake 7 such as a threaded wing nut that, manually without a tool, presses the upper slider on lower slider 3 compressing them, but allowing different levels of resistance until they are completely blocked.

The arrangement of the lateral locking element, the grip system and the opening control are arranged in the lower part of the device, leaving the entire upper part free. For this reason, the simultaneous work of several professionals is facilitated. The case in which the dentist uses the device in her/his displacement while the ENT doctor performs a fibroscopy can be taken as a reference. There is no conflict between both professionals and both can carry out their intervention without coming across the hands of the other professional as an obstacle.

Furthermore, the device can be locked in a specific position for taking images by means of a scanner through the side windows 12 made on the trays 11*a* and 11*b* from the pre-cut surface, thus being possible to compare or reference with images being previously taken, or in an analog way by fixing trays to each other, without being removed from the mouth and without the need to open the window 12.

The position of the trays with respect to both jaws can be recorded in two ways:

from the fixation with acrylics or composites that serve as filling between the two trays, upper and lower;

permanently fixing both trays or creating a frame that, despite guaranteeing the position with a positioner (Poka Yoke), allows the trays to be separated to work them individually.

Either of these two options allows a record to be obtained from which it is possible to obtain a print of the referenced upper bite with respect to the lower bite or to use other techniques included in the manufacture of MAD or splint and that, in the case of the dental clinics, do not depend on digital means and optimize processes by shortening times and reducing efforts by being able to send the trays directly to the laboratory for the next steps in manufacturing that may require the scanning of the positioned trays themselves.

The reduction of steps in the manufacturing processes and the digitization of them at the time of taking measurements entails the elimination of possible tolerances or accumulated errors in the summation of processes. In addition, this allows the professional to make a decision and, consequently, make a diagnosis, without the need for the patient to return another day, thus improving their user experience and reducing associated time and costs.

When the professional needs to record the exact position in which the jaw has been positioned, she/he takes images of the premolars and/or canines that are visible thanks to the windows 12 and references said images with previously digitized images without a device.

It is also possible to reach digitization by scanning the blocked trays or, from a software, transferring the measurements offered by the device both for horizontal movement and vertical opening.

Since the size of the arch can vary depending on the individual, for disposable trays at least two sizes are contemplated, the holding part having fixed sliders and variable space available to contain the impression of the bite.

The present invention is presented as a unique solution to mandibular advancement measurement and positioning devices incorporating the opening measurement function and, consequently, allowing all frontal movements to be carried out and, specifically, in the case of taking records for the manufacture of a MAD, allows a drastic reduction in the number of processes optimizing them in addition to not requiring the use of George's gauge to obtain the vertical measurement and, consequently, the MAD can be manufactured so that the upper and lower part slide without dental occlusion.

In view of this description and figures, the person skilled in the art will be able to understand that the invention has been described according to some preferred embodiments thereof, but that multiple variations can be introduced in said preferred embodiments, without exceeding the object of the invention as it has been claimed.

The invention claimed is:

1. A mandibular advancement measuring and positioning device provided with an instrument with an upper slider and a lower slider, means to measure and position the relative displacement of the upper and lower sliders, and upper and lower trays at one end of the instrument, the upper and lower trays being attached to the upper and lower sliders, respectively, wherein the lower slider is divided into a fixed part and a pivoting part joined to an end of the fixed part, the upper slider and the lower slider being joined by means of a recess that allows a relative slide of the upper and lower sliders, wherein the pivoting part of the lower slider is provided with a vertical opening control, and wherein the vertical opening control is configured to create a gap between the upper slider and the lower slider.

2. The mandibular advancement measurement and positioning device according to claim 1, wherein the means to measure and position the relative displacement of the upper and lower sliders include a metric scale on the upper slider and on the vertical opening control.

3. The mandibular advancement measuring and positioning device according to claim 1, wherein the means to measure and position the relative displacement of the upper and lower sliders include digital means provided with a display.

4. The mandibular advancement measurement and positioning device according to claim 1, wherein the vertical opening control is provided with a strap adapted to exert pressure on the pivoting part of the lower slider towards the upper slider, ensuring that separation between the upper and lower sliders is determined by the vertical opening control.

5. The mandibular advancement measurement and positioning device according to claim 1, wherein the instrument is reusable and the trays are disposable consumables.

6. The mandibular advancement measuring and positioning device according to claim 1, further comprising a mechanical brake between the upper slider and the fixed part of the lower slider to control the relative slide of the upper and lower sliders and that allows the application of different pressures from their total freedom to their absolute blocking.

7. The mandibular advancement measuring and positioning device according to claim 1, wherein the trays are provided with a pre-cut surface for manual removal that creates windows in their side walls that allow canines and premolars to be visible for taking digital images by means of a 3D scanner.

8. The mandibular advancement measuring and positioning device according to claim 1, wherein the trays each have a body that holds a respective one of the sliders, a part provided with cavities for taking impressions, and a flexible part that joins the body with the part provided with cavities.

9. The mandibular advancement measuring and positioning device according to claim 1, wherein each of the sliders is provided with a ring at an end opposite to a respective one of the trays to insert one or more fingers of a hand.

10. A mandibular advancement measuring and positioning device provided with an instrument with an upper slider and a lower slider, means to measure and position the relative displacement of the upper and lower sliders, and upper and lower trays at one end of the instrument, the upper and lower trays being attached to the upper and lower sliders, respectively, wherein the lower slider is divided into a fixed part and a pivoting part joined to an end of the fixed part, the upper and lower slider being joined by means of a recess that allows a relative slide of the upper and lower sliders, wherein the pivoting part of the lower slider is provided with a vertical opening control, and wherein each of the sliders is provided with a ring at an end opposite to a respective one of the trays to insert one or more fingers of a hand.

* * * * *